Patented Dec. 8, 1925.

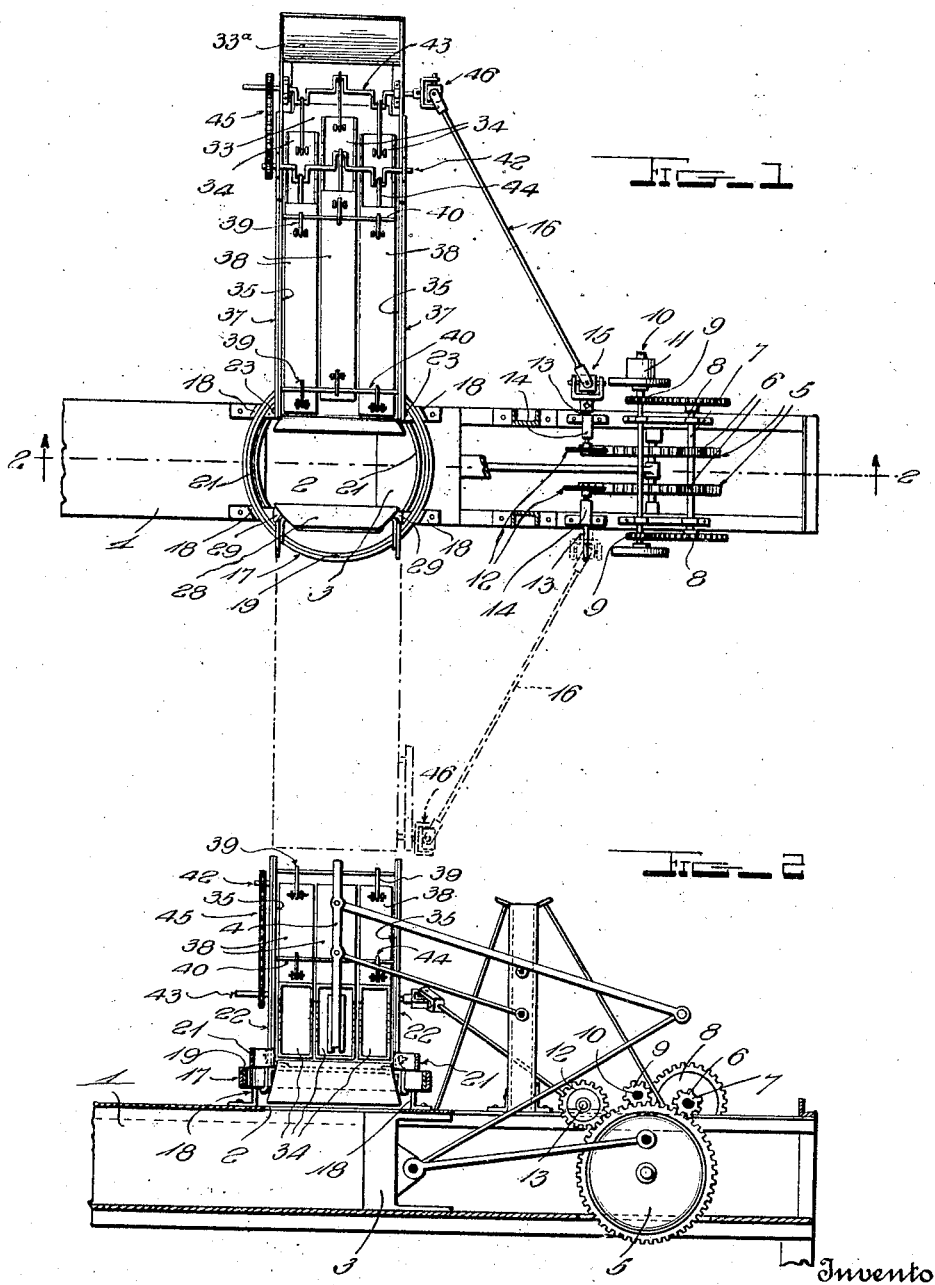

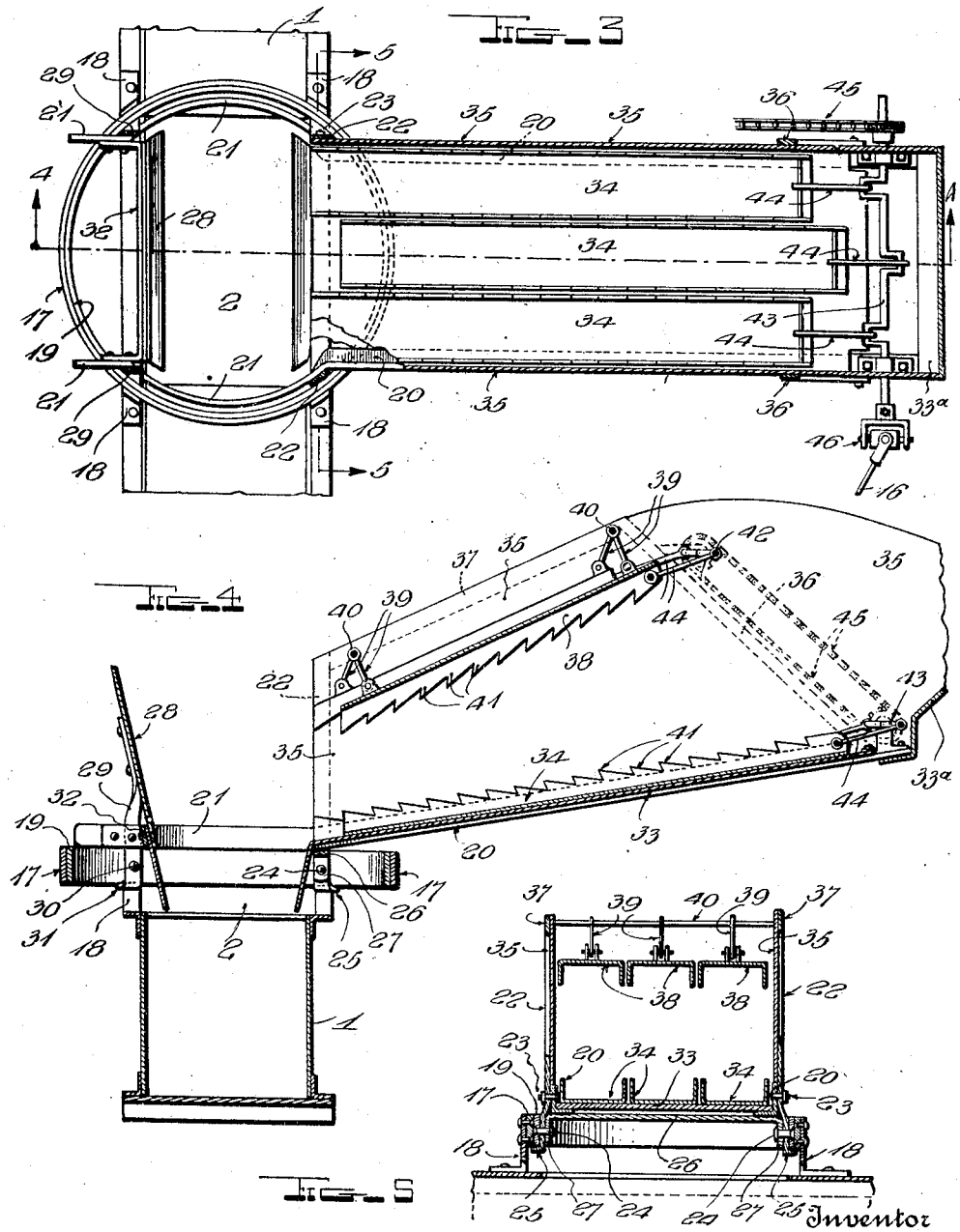

1,564,629

UNITED STATES PATENT OFFICE.

WILLIAM CHESTER RUTH, OF GAP, PENNSYLVANIA, ASSIGNOR OF ONE-HALF TO HOWARD L. RUTTER, OF GAP, PENNSYLVANIA.

BALING-PRESS FEEDER.

Application filed October 3, 1924. Serial No. 741,373.

*To all whom it may concern:*

Be it known that I, WILLIAM C. RUTH, a citizen of the United States, residing at Gap, in the county of Lancaster and State of Pennsylvania, have invented certain new and useful Improvements in Baling-Press Feeders; and I do declare the following to be a full, clear, and exact description of the invention, such as will enable others skilled in the art to which it appertains to make and use the same.

My invention relates to improvements in baling presses, and more particularly to feeders for supplying the hay or straw to the inlet throats of the machines. Devices for this purpose have heretofore been provided, but the feeders previously used cannot be extended at will from either side of the body of the press, according to the side upon which the stack of hay or the hay mow, is located. It is the principal object of my invention however, to provide an improved construction for mounting the feeder so that it may be swung laterally to either side of the body of the press when the machine is in operation and may be swung to a position at which it is disposed longitudinally over said body, when the machine is to be transported.

With the foregoing in view, the invention resides in the novel subject matter hereinafter described and claimed, the description being supplemented by the accompanying drawings.

Figure 1 is a plan view partly in horizontal section showing the feeder extended laterally in one direction in full lines and laterally in the other direction in dotted lines.

Figure 2 is a longitudinal sectional view as indicated by line 2—2 of Fig. 1.

Figure 3 is an enlarged plan view of the feeder, partly in horizontal section.

Figure 4 is a sectional view on line 4—4 of Fig. 3.

Figure 5 is a transverse section as indicated by line 5—5 of Fig. 3.

In the drawings above briefly described, the numeral 1 designates the body of a well known portable baling press, said body having the usual inlet throat 2 in its upper side for the hay or straw to be baled. 3 designates the plunger operable within the baling chamber of the press, 4 has reference to the tamper which forces the material through the throat into the baling chamber, and the numerals 5 designate the two main operating gears for the plunger and tamper. The numerals 6 designate pinions on a transverse shaft 7, meshing with the gears 5, said shaft having gears 8 meshing with pinions 9 on a drive shaft 10 which is provided with a belt pulley 11. This arrangement is common for operating the press, and the feeder hereinafter described may be operated from any desired part or parts of this press operating mechanism. In the present showing, however, I have illustrated gears 12 meshing with the gears 5 and secured to the inner ends of a pair of short transverse shafts 13 which are mounted in bearings 14 secured to the frame of the machine. A universal joint 15 is applicable to the outer end of either of the shafts 13, for connecting a feeder driving shaft 16 thereto, permitting said shaft to extend laterally from either side of the baling press, according to the side at which the feeder is disposed. This feeder is preferably constructed and mounted in the manner described below.

A horizontal annular track 17 is disposed over the body 1, around the throat 2, said track having appropriate carrying brackets 18 which are secured to the baling press in any suitable manner. Disposed slidably within the track 17, is a ring 19, and a pair of slightly inclined bars 20 are provided with substantially horizontal end portions 21 which extend across the upper edge of said ring and rest on the track 17 to guide said ring against downward movement with respect to the track. The end portions 21 of the bars 20 preferably bow outwardly as shown in Fig. 3. A pair of vertical bars 22 are secured by bolts or the like 23 to the bars 20 and have their lower ends extended across the inner side of the ring 19, rivets or the like 24 being employed to secure said bar ends and ring together. The lower extremities 25 of the bars 22 are bent laterally outward to engage the lower edge of the track 17 and hold the ring 19 and associated parts against upward movement with respect to said track. Preferably, a transverse bar 26 extends between the bars 22 under the bars 20, and is provided with downturned ends 27 secured by the rivets 24.

A feeding mechanism is mounted on the bars 20, at the outside of the track 17 and ring 19, and at the inner ends of this feeder, a fender 28 extends across said ring. This fender is carried by vertical bars 29 which are secured to the horizontal portions 21 of the bars 20, the lower ends of the bars 29 being also secured by rivets or the like 30 to the inner side of the ring 19, and having their lower extremities bent outwardly at 31 under the track 17, to assist in preventing any upward movement of the ring with respect to the track. Preferably, a second transverse bar 32 extends between the bar ends 21, adjacent the fender 28 and bars 29, as shown for instance in Fig. 3.

In the construction shown, a horizontal plate 33 is secured upon the bars 20 and supports a plurality of reciprocatory feed members 34. Side walls 35 rise from the edges of the plate 33 and are secured at their inner ends of the bars 22, while other but longer bars 36 rise from the outer extremities of the bars 20 to provide means to which the outer portions of the plates or walls 35 are secured. The plates or walls 35 extend beyond the bars 36 and co-act with an inclined plate 33ª in forming a receiving hopper for the material to be baled. Longitudinal crown bars 37 extend between the upper ends of the bars 22 and 36 and co-act therewith in forming a pair of side frames which carry the plates or walls 35 and assist in supporting an upper set of feed members 38, these members being hung on links 39 which are in turn hung on transverse rods 40 which extend between the crown bars 37. Preferably, each feed member 34 or 38 is formed with a single metal plate having its parallel side edges bent laterally in the same direction and notched to form teeth 41. For driving these feed members, I have shown upper and lower crank shafts 42 and 43 connected with said members by links or pitmen 44, the two shafts being connected for rotation in unison, by sprockets and a chain 45. A universal joint 46 is applicable to either end of the shaft 43 for connecting the shaft 16, above described, to said shaft 43, regardless of the side of the machine to which the feeder is swung.

It will be seen from the foregoing, that whenever the shaft 16 is disconnected from the shaft 43, the entire feeder and its carrying ring 19 may be swung horizontally to any desired position. This permits the feeder to be extended laterally from either side of the machine and also permits it to occupy a position extending longitudinally over said machine, when the latter is to be transported. The shaft 16 is applicable to either end of the shaft 43 and to either of the shafts 13, so that the feeder may be adequately driven when in either of its operative positions.

As excellent results are obtainable from the details disclosed, they may well be followed, but within the scope of the invention as claimed, numerous modifications may be made.

I claim:

1. An attachment for a baling press comprising an annular track adapted to be secured around the inlet throat of a baling press in a horizontal position, a ring disposed slidably within said track, a pair of feeder-carrying bars having horizontal end portions secured to said ring and resting on said track, and vertical bars at the inner side of said ring and secured with respect thereto, the lower ends of said vertical bars having lugs underlying the track to prevent upward movement of the ring.

2. An attachment for a baling press comprising an annular track adapted to be secured around the inlet throat of a baling press in a horizontal position, a ring disposed slidably within said track, a pair of bars having horizontal end portions extending over said ring and resting on said track, a feeder carried by said bars at the outer side of said ring and track and having vertical side plates, vertical bars secured to said side plates, to the first named bars and to the inner side of said ring, a fender at the side of the ring opposite said feeder, and other vertical bars carrying said fender and secured to the first named bars and to the inner side of said ring, the lower ends of all of said vertical bars having outward projections engaging the lower edge of the track.

3. An attachment for a baling press comprising an annular track adapted to be secured upon the inlet throat of a baling press in a horizontal position, a ring disposed slidably within said track, a feeder-carrying frame having a horizontal portion resting on said track and secured to said ring, and vertical bars at the inner side of said ring and secured with respect thereto, the lower ends of said bars having lugs underlying the track to prevent upward movement of the ring.

In testimony whereof I have hereunto affixed my signature.

WILLIAM CHESTER RUTH.